June 21, 1966    A. VISCHER, JR    3,257,094
VALVE
Filed April 30, 1962    2 Sheets-Sheet 1

INVENTOR.
Alfred Vischer, Jr.
BY
Fidler, Berkley & Bradley
ATTORNEYS

June 21, 1966  A. VISCHER, JR  3,257,094
VALVE
Filed April 30, 1962  2 Sheets-Sheet 2

INVENTOR.
Alfred Vischer, Jr.
BY
Fidler, Beardsley & Bradley
ATTORNEYS

United States Patent Office 3,257,094
Patented June 21, 1966

3,257,094
VALVE
Alfred Vischer, Jr., 909 S. Cumberland Ave., Park Ridge, Ill.
Filed Apr. 30, 1962, Ser. No. 191,024
6 Claims. (Cl. 251—133)

The present invention relates to valves, and more particularly it relates to a new and improved ball valve and drive motor assembly for controlling the passage of fluids therethrough.

A principal object of the present invention is to provide a new and improved valve.

Another object of the present invention is to provide a new and improved valve construction which is adapted to be driven between open and closed positions by motor-operated means.

Still another object of the present invention is to provide a new and improved valve and drive motor assembly.

A further object of the present invention is to provide a new and improved ball valve and drive motor therefor which is compact and sturdy in construction and efficient and dependable in operation.

Further objects and advantages and a better understanding of the present invention may be had by reference to the following detailed description taken in connection with the accompanying drawings in which.

Figure 1:
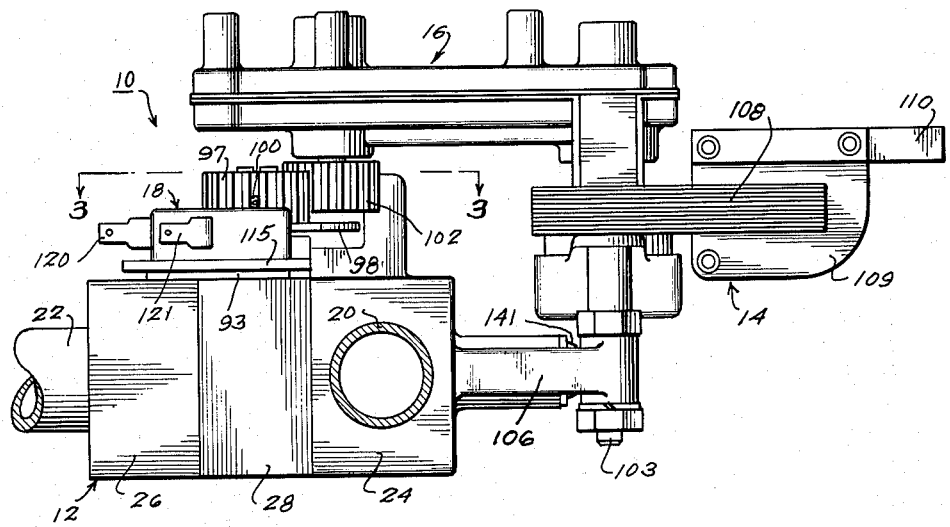
FIG. 1 is a side elevational view of a valve and drive motor assembly embodying the present invention.

Referring now to the drawings and particularly to FIG. 1 thereof, there is shown a valve and drive motor assembly 10 comprising as its principal elements a ball valve 12, an electric drive motor 14 and a gear train 16 operatively interconnected between the motor and the valve. A conventional snap-acting control switch 18 is incorporated in the assembly for actuation thereof in accordance with the operative condition of the valve and if desired it may be suitably connected in the control circuit of the motor 14 so as to control the operation of the motor 14. For example, depending upon the purpose of the valve in the associated system, the motor 14 may be energized to drive the valve into an open position in one cycle of operation and into a closed position in a succeeding cycle or vice versa.

Figure 2:
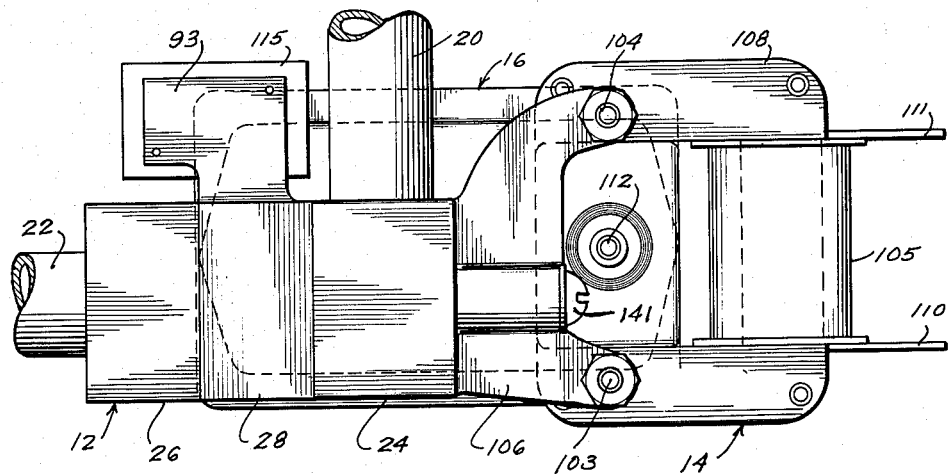
FIG. 2 is a bottom view of the valve and motor assembly of FIG. 1.
Figure 3:
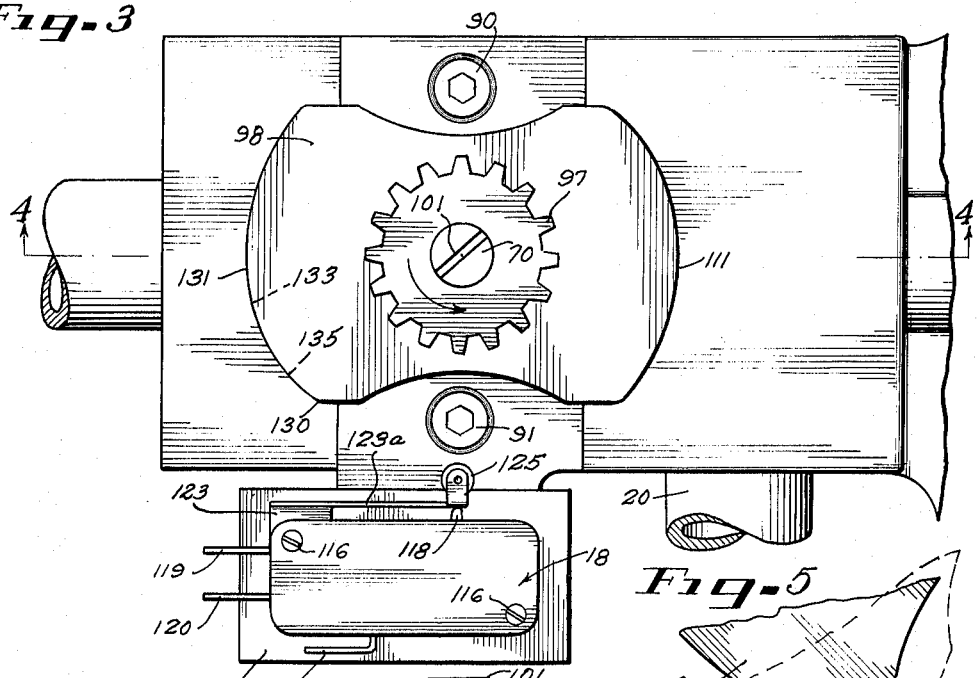
FIG. 3 is a fragmentary view of the assembly of FIG. 1 taken along the line 3—3 thereof showing the top side of the valve.
Figures 4, 5:
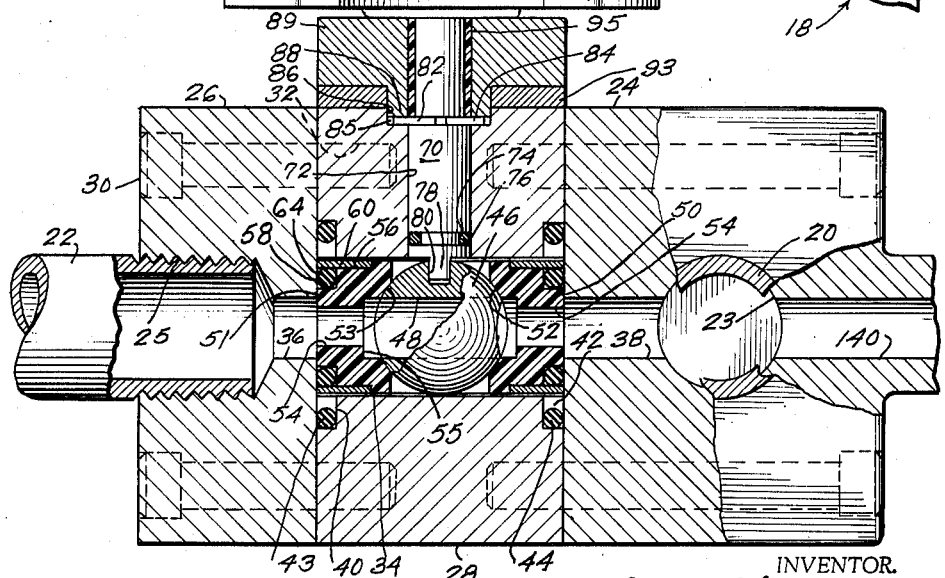
FIG. 4 is a fragmentary, partially sectioned view taken along the line 4—4 of FIG. 3 to particularly show the internal construction of the valve.
FIG. 5 is a fragmentary view, greatly enlarged, illustrating the operation of a camming mechanism embodied in the assembly of FIG. 1.

As best shown in FIGS. 2, 3 and 4, the valve 12 is connected between a fluid inlet conduit 20 and a fluid outlet conduit 22. The valve 12 may thus be suitably connected in a fluid system which may, for example, be the steam line to a pressure cooker of the type disclosed in co-pending application Serial No. 677,432 (Churley Case 1), filed August 12, 1957 by George Churley, now U.S. Patent No. 3,071,473, granted January 1, 1963. The inlet conduit 20 is threadedly received in a counterbore 23 in an inlet block 24 and the outlet conduit is threadedly received in a counterbore 25 in an outlet block 26, both of which blocks are substantially square in cross section. The blocks 24 and 26 are secured to opposite ends of a valve chamber block 28, which is also square in cross section, by means of a plurality of Allen head screws 30 which extend through respective holes in the blocks 24 and 26 and are threadedly received in suitably disposed recesses 32 in the valve chamber block 28. The abutting surfaces of the blocks 24, 26 and 28 have a flat, smooth finish whereby the three blocks are tightly fitted together into a separable, unitary valve housing.

A valve chamber is provided by a bore 34 which extends through the block 28 in axial alignment with a bore 36 in the outlet block 26 and a corresponding bore 38 in the inlet block 24. As illustrated in FIG. 4, the inlet conduit 20 and the counterbore 23 in which it is received are disposed at right angles to the bore 38 and are in communication therewith within the inlet block 24. As best shown in FIG. 4, the valve chamber defining bore 34 is substantially larger in diameter than the inlet and outlet bores 36 and 38 which for ease of fabrication may conveniently be equal in diameter to one another.

In order to seal the valve chamber from the surroundings, a pair of resilient O-rings 43 and 44 are received in respective ones of a pair of counterbores 40 and 42 located at opposite ends of the chamber bore 34. The rings 43 and 44 are compressed between the chamber block 28 and the end blocks 24 and 26 when the unit is assembled as shown, whereby the sealing rings 43 and 44 prevent the leakage of fluid out of the system through the spaces between the blocks 24, 26 and 28. Since the width of the shoulders formed by the counterbores 40 and 42 greatly exceeds the width of the O-rings 43 and 44, the O-rings are substantially self-locating between the adjacent blocks.

In order to control the passage of fluid through the valve 12, there is provided in accordance with an important feature of the present invention a substantially spherical valve member 46, commonly called a ball valve member, having a cylindrical hole 48 extending diametrically therethrough and mounted for rotation about the vertically disposed diameter thereof as viewed in FIG. 4.

The ball valve member 46 has a radius slightly less than that of the chamber bore 34 and is centrally located therein between and by means of a pair of substantially identical tubular valve seats 50 and 51. The seats 50 and 51 are loosely received in the chamber bore 34 and include annular seating surfaces 52 and 53 which conform to the adjoining surface of the ball 46. The seats 50 and 51 are identical and each has an axial hole 54 which is counterbored at 55 so as to have at the location of the ball 46 a diameter substantially equal to that of the valve bore 48. The seats also include an annular stepdown portion 56 receiving a retaining sleeve 60.

A further annular step-down portion 58 together with the outer end of the sleeve provides an annular groove in which is disposed a resilient O-ring 64. The O-rings 64 are each compressed between the adjacent block 24, 26 and the block 28 and thus function to provide a seal preventing leakage around the respective seats 50 and 51. Accordingly, fluid is prevented by the O-ring 64 from by-passing the seat 50 and flowing directly into the outlet conduit.

As indicated hereinbefore, the valve seats 50 and 51 and the associated retaining sleeves 60 are loosely received within the bore 34 in the chamber block 28 thereby to be located in the chamber bore 34 by means of the ball 46 itself, thus insuring an accurate alignment of the ball 46 with its seats 50 and 51 so as to minimize drag. Preferably, the seats are formed of a good wear-resistant material such for example as tetrafluoroethylene.

In order to rotate the ball 46 within the valve chamber, thereby to control the alignment of the passageway 48 with the passageways 54 through the valve seats 50 and 51, there is provided a vertically disposed valve stem 70 which extend through a cylindrical hole 72 communicating with the chamber defining bore 34 and disposed at right angles relative thereto. A resilient O-ring 76 is disposed in an annular groove 74 in the stem 70 and sealably compressed between the stem 70 and the wall of the hole 72 to prevent the leakage of fluids from the valve chamber. The stem 70 is provided at its lower end with a generally rectangular flat tongue 78 which is received in a similarly shaped slot 80 located in the ball 46 at right angles to the bore 48. Accordingly, axial rotation of the stem 70 causes rotation of the ball 48 about its vertical diameter which extends perpendicularly to the longitudinal axis of the bore 48.

In order to secure the stem 70 in the valve chamber block 28, and prevent axial movement thereof, the stem is provided with an annular groove 82 in which is received a spring tensioned split washer or ring 84 having an external diameter exceeding the diameter of the hole 72. Movement of the stem 70 into the block 28 is thereby prevent by engagement of the ring 84 with the shoulder 85 surrounding the hole 72. Since the tongue 78 does not bottom in the groove 80 when the ring 84 engages the shoulder 85, no axial force is exerted on the ball 46 by the stem 70. As shown in FIG. 4, the hole 72 is counterbored at 86 to receive the snap ring 84 and to also receive a depending boss 88 on a bearing plate 89 which is secured to the chamber block 28 by means of a pair of countersunk Allen head screws 90 and 91 thereby to prevent removal of the stem 70 from the chamber block 28. Consequently, the single snap ring 84 limits axial movement of the stem 70 in both directions.

A switch support plate 93 is sandwiched between the bearing plate 89 and the chamber block 28 to provide a rigid support for the control switch 18 and to locate it relative to the valve stem 70. Since, as more fully described hereinafter, the stem 70 is driven from the top and, moreover, since the switch is actuated from the upper portion of the stem 70, it is desirable to also journal the stem 70 near the upper end thereof, a bearing sleeve 95 may be fixedly positioned within the plate 89 to provide a suitable bearing surface for the upper portion of the stem 70.

As previously described, the valve 12 is driven from the gear train 16. Therefore, a spur gear 97 is fixedly attached to the stem 70 by means of a set screw 100. A control cam 98 having two diametrically opposed camming surfaces is fixed to the bottom of the gear 97. Accordingly, the angular position of the gear 97 determines the operative position of both the valve member 46 and the cam 98. A diametric slot 101 is provided in the upper end of the stem 70 in parallel relation with the passageway 48 through the ball 46 to provide a visual indication of the operative condition of the valve 12.

The gear train 16, which is driven by the motor 14, is a conventional step-down gear set to the output shaft of which is connected a spur gear 102 which mates with the gear 97 thereby to drivingly rotate the valve stem 70 and the associated valve ball 46. The housing of the gear train 16 and the motor 14 are secured together by means of a pair of studs 103 and 104 and associated nuts. The studs are also secured to a bracket portion 106 which is integral with and extends from the inlet block 24. Hence, the valve 12, motor 14 and gear train 16 are interconnected in a unitary assembly.

As best shown in FIGS. 1 and 2 the motor 14 is a conventional A.C. motor and includes a laminated stator 108 having an energizing winding or coil 109 wound thereon. A pair of power terminals 110 and 111 are electrically connected to opposite ends of the coil 109. The motor 14 is conventional and for that reason need not be described in detail herein. Preferably, it is of the type in which the rotor, together with the rotor shaft 112, is spring-biased downwardly, as viewed in FIG. 1, out of operative engagement with the input to the gear train 16, whereby the rotor shaft is operatively connected to the gear set 16 only when the motor is energized. Upon energization of the winding 109 by the passage of a current between the terminals 110 and 111, the magnetic field developed across the air gap of the stator 108 pulls the rotor upwardly against the force of the biasing spring more fully into the field of the stator, thereby to operatively connect the motor 14 to the gear train 16 and thus to the valve 12. When, however, the motor is deenergized, the motor 14 is automatically disconnected from the gear train 16 by virtue of the spring bias mechanism. In this way over-travel of the valve ball 46 upon deenergization of the motor 14 is minimized inasmuch as the rapidly rotating, relatively high-inertia rotor is disconnected from the system and the inherent friction of the valve mechanism is sufficient to stop movement of the valve ball 46 before an excessive amount of over-travel can occur. Since the passageway 48 and the counterbores 55 have a substantially greater diameter than the seat passageway or bores 54, a substantial misalignment of the passageway 48 with the seats 50 and 51 can be tolerated without any noticeable drop in the rate of fluid flow through the valve.

In accordance with a feature of the valve assembly 10, a snap-acting switch 18 is actuated in accordance with the operative position of the valve member 46 within the valve chamber. Since the valve 12 has two complete cycles of operation, i.e., open and closed in each cycle for every complete revolution of the valve stem 70, the cam 98 has two diametrically disposed camming surfaces. Since the switch 18 is actuated in accordance with the condition of the valve 12 it may be connected in the control circuit for the motor 14 in a conventional manner to deenergize the motor 14 when the valve 12 is open and/or to deenergize the motor when the valve is closed. To this end, the switch 18 is suitably secured to a switch insulator plate 115 by means of a pair of screws 116 which also function to secure the plate 115 to the switch mounting bracket 93. The switch 18 includes an actuating plunger 118 which opens and closes two sets of contacts in the switch housing thereby to control the electrical connections within the switch 18 between a plurality of externally extending terminal members 119, 120 and 121. When the plunger 118 is in the fully extended or projected position as shown in FIG. 3, the switch is in one switching condition of operation, and with the plunger 118 depressed at least a predetermined amount, as shown in dotted lines in FIG. 5, the switch 18 is in another switching condition. For example, with the switch in the fully extended position as shown in solid lines in FIG. 5, the terminal 120 may be connected to the common terminal 121 with the terminal 119 disconnected from both other contacts, while with the actuator 118 in the depressed dotted line position shown in FIG. 5, the terminal 120 may be disconnected from both of the terminals, and the terminal 119 may be connected to the common terminal 121.

In order to operate the switch 18 in accordance with the position of the valve member 46 relative to the valve seats 50 and 51, a switch actuator bracket 123 is secured to the insulator plate 115 and includes a cantilever spring arm 123a in the yoked end of which a roller 125 is rotatably supported. In the unstressed condition the arm 123a lightly engages the end of the plunger 118. Although the gear 97 may be driven in either direction in order to successively open and close the valve 12, the gear 97 and the stem 70, to which it is attached, must rotate counterclockwise. Consequently, the edge 130 of the cam surface section 131 of the cam 98 constitutes the leading edge thereof, and must be modified as best shown in FIG. 5 to prevent chattering when the cam 130 first engages the roller 125. It has a radius relative to the axis of the stem 70 equal to slightly less than the distance between the periphery of the roller 125 and the axis of the stem 70. The radius of the cam surface relative to the axis of the stem 70 thereafter increases gradually along a smooth curve to a truly arcuate portion beginning at approximately the location thereon indicated by the dotted line 133. As shown in FIG. 5, this rise in the cam surface is greater than that required to depress the switch actuator 118 the required distance to actuate the switch 18, whereby the switch 18 is actuated by the cam 98 at a location intermediate the leading edge 130 and location 133. However, the maximum radius of the cam surface must be less than that which causes the actuator 118 to bottom and thus jam or otherwise damage the mechanism. While the exact place on the cam surface at which the switch 18 operates is not critical, as long as it is properly located relative to the valve passageway 48, it may be conveniently located therebetween at the median point 135. When actuation of the snap-switch 18 thus occurs, the motor 14 is deenergized thereby to disconnect the rotor thereof from the gear train 16. Therefore, the spring tension on the roller 125 provided by the cantilever arm 123a and by the spring mechanism within the switch 18 exerts a clockwise torque on the cam 98 tending to rotate it in a direction opposite to the normally driven direction. To prevent such torque from returning the valve stem 70 toward an open position and to thereby release the plunger 118 and once more energize the motor 14 to initiate an oscillatory hunting condition, it is important that the slope of the cam surface in the vicinity of the actuating point 135 be extremely gradual such, as for example, an increase in the cam radius of one-sixteenth of an inch in thirty degrees per angular degree of cam surface where the cam radius is about three-quarters of an inch. A substantially larger rise of the cam surface at this location can result in hunting of the system unless a substantial amount of friction is provided within the valve 12 to overcome the torque exerted by the switching mechanism on the cam 98. However, while a hunting condition can thus be prevented, the efficiency of operation of the valve is necessarily compromised.

In order to enable purging of dirt or other undesired matter from the valve without substantially complete disassembly thereof, a straight hole 140 extends out through the block 24 in alignment with the bore 38 and a removable plug in the form of a screw 141 and associated sealing gasket is secured therein. Accordingly, with the valve member 46 in the open position and the plug 141 removed, a straight tool, such, for example, as a cylindrical rod, may be pushed completely through the valve 12, thereby to dislodge any matter which may be entrapped therein.

In the illustrated embodiment of the invention the valve stem 70 is driven from the gear train 16 by means of a pair of spur gears 97 and 102 and the snap-switch 18 is mounted directly on the valve housing. However, where desired, the stem 70 may be elongated to extend directly into the gear train 116 and thereby to comprise the output shaft thereof, thus eliminating the need for the drive gears 97 and 102. Moreover, the stem 70 may extend upwardly beyond the upper side of the gear train housing whereby the cam 98 may be secured thereto above the housing of the gear train 16, in which case the switch 18 should also be mounted on the upper side of the gear train housing for operation thereof by the cam 98. In other respects the operation of this alternate valve and drive motor assembly will be the same although because of the elimination of the two gears 97 and 102, the direction of rotation of the motor 14 must be reversed or the cam 98 should be inverted so that the gradual sloping leading edge surface thereof will be initially presented to the switch actuating roller 125.

While the present invention has been described in connection with particular embodiments thereof, it will be understood that those skilled in the art may make many changes and improvements without departing from the true spirit and scope of the invention. Therefore, by the appended claims, it is intended to cover all such changes and modifications which come within the true spirit and scope of the invention.

I claim:
1. A valve comprising a first block having a bore extending therethrough and a pasageway extending at right angles to said bore into communication therewith, a second block secured to one side of said first block and having an aperture therethrough communicating with one end of said bore, a third block secured to the opposite side of said first block and having an aperture therethrough communicating with the other end of said bore, a valve chamber provided in said first block and operatively positioned with respect to said bore thereof, a substantially spherical valve member operatively positioned in said valve chamber and having a diametrically disposed hole therethrough, said spherical valve member being disposed in said bore and having a radius slightly less than the radius of said bore thereby to be loosely received therein, a pair of generally tubular valve seat members positioned in opposite ends of said bore and having longitudinally extending channels therethrough opening at one end at said valve member and at the other into the aperture in the adjacent one of said second and third blocks, each of said tubular valve seat members formed of a wear resistant material with an annular step-down portion, a retaining sleeve operatively mounted in each of said tubular valve seat members providing accurate alignment of the spherical valve member, another annular step-down portion of smaller diameter than the first-mentioned step down portion, a pair of resilient sealing rings operatively mounted in said another step-down portion of said tubular valve seat members, each of said rings being compressed between the end of a respective one of said tubular valve seat members and the adjacent one of said second and third blocks to resiliently urge said tubular valve seat members against said spherical valve member and to seal said seats to said second and third blocks, a pair of resilient self-sealing O-rings operatively mounted in counterbores on opposite sides of the chamber bore whereby the self-sealing O-rings prevent leakage of fluid out of the system to which the valve is operatively connected between respective second and third blocks detachably affixed to the first block, a valve stem sealably journalled in said passageway and connectively engaging said spherical valve member to impart rotary movement thereto, and said spherical valve member, said tubular valve seat members, and retaining sleeves complementally formed to the circumference of the bore of the first-mentioned block and detachably mounted within the bore of the first-mentioned block from either side thereof, whereby the aforesaid parts may be detachably replaced.

2. A valve as set forth in claim 1 wherein said valve stem is detachably connected to said spherical valve member and comprises a tongue-like extension at the inner end thereof received in an aperture complementally formed to said tongue-like extension in said spherical valve member, said tongue-like extension being axially movable in the aforesaid aperture in which it is received.

3. A ball valve for a fluid system comprising three blocks secured togther in contiguous relationship, the end ones of said blocks having respective apertures therethrough connecting with opposite ends of a cylindrical bore through the middle one of said blocks, said middle one of said blocks including a valve chamber, a substantially spherical valve member operatively mounted in said valve chamber, and disposed in said bore and having a passageway extending therethrough, a pair of tubular valve seat members loosely disposed in said bore on opposite sides of said spherical valve member in substantial alignment with said bore, each of said tubular valve seat members formed of a wear resistant material with an annular step-down portion, a retaining sleeve operatively mounted in each of said tubular valve seat members providing accurate alignment of the spherical valve member, another annular step-down portion of smaller diameter than the first-mentioned step-down portion, a pair of resilient sealing rings in said another step-down portion of smaller diameter and compressed between the respective ends of said seats and the adjacent end ones of said blocks whereby said seats are resiliently biased into seating engagement with said valve member, said spherical valve member, said tubular valve seat members and retaining sleeves complementally formed to the circumference of the bore of the middle one of said three blocks and detachably mounted within the bore of the middle block from either side thereof, whereby the aforesaid parts may be detachably replaced, and means for turning said valve member in said middle block to control the passage of fluid between the apertures in said end blocks.

4. The ball valve of claim 3 wherein said means for turning said valve members comprises a rotatable stem extending through a hole in said middle block into connecting engagement with said spherical valve member, said spherical valve member being movable in said bore along the longitudinal axis of said stem whereby said spherical valve member and said tubular valve seats are floatingly positioned in said bore.

5. A valve as set forth in claim 1, comprising a cleaning passage extending from the outside of said valve in one of said outer blocks and aligned with said bores of the aforesaid blocks, said tubular valve seat members and spherical valve member, and a plug removably fixed in the end of said cleaning passage, whereby to permit facile cleaning of said valve by removal of said plug and insertion of a rod through the bores of said valve while said spherical valve member is in an open position.

6. A valve comprising a first block having a bore extending therethrough and a passageway extending at right angles to said bore into communication therewith, a second block secured to one side of said first block and having an aperture therethrough communicating with one end of said bore, a third block secured to the opposite side of said first block and having an aperture therethrough communicating with the other end of said bore, a substantially spherical valve member having a diametrically disposed hole therethrough, said valve member being disposed in said bore and having a radius slightly less than the radius of said bore thereby to be loosely received therein, a pair of generally tubular valve seat members positioned in opposite ends of said bore and having longitudinally extending channels therethrough opening at one end at said valve member and at the other into the aperture in the adjacent one of said second and third blocks, each of said tubular valve seat members formed of a wear resistant material with an annular step-down portion, a retaining sleeve operatively mounted in each of said tubular valve seat members providing accurate alignment of the spherical valve member, another annular step-down portion of smaller diameter than the first-mentioned step-down portion, a pair of resilient sealing rings operatively mounted in said another step-down portion of said tubular valve seat members, each of said rings being compressed between the end of a respective one of said seat members and the adjacent one of said second and third blocks to resiliently urge said seats against said valve member and to seal said seats to said second and third blocks, a pair of resilient self-sealing O-rings operatively mounted in counter-bores on opposite sides of the chamber bore whereby the self-sealing O-rings prevent leakage of fluid out of the system to which the valve is operatively connected between the respective second and third blocks detachably affixed to the first block, a valve stem sealably journalled in said passageway and connectively engaging said valve member to impart rotary movement thereto, said valve stem extending out of said first block, an electric motor mounted on at least one of said second and third blocks, coupling means interconnecting said motor with said stem, an electric switch for controlling the energization of said motor, said switch including a movable actuating member, and a cam mounted on said stem in operative engagement with said switch actuating member for controlling said switch in accordance with the angular position of said stem.

References Cited by the Examiner

UNITED STATES PATENTS

| | | | |
|---|---|---|---|
| 1,479,963 | 1/1924 | Hop | 137—245.5 |
| 1,624,168 | 4/1927 | Gschwind | 137—245.5 |
| 2,044,025 | 6/1936 | Windas | 251—134 X |
| 2,527,851 | 10/1950 | Ray | 251—134 |
| 2,723,830 | 11/1955 | Markley | 251—134 |
| 2,895,496 | 7/1959 | Sanctuary | 251—317 X |
| 2,977,437 | 3/1961 | Daone | 251—134 X |
| 2,992,377 | 7/1961 | Ekstrom | 251—134 X |
| 3,006,602 | 10/1961 | Usab | 251—315 |
| 3,009,680 | 11/1961 | Kaiser | 251—315 |
| 3,101,752 | 8/1963 | Martin | 251—315 X |
| 3,150,681 | 8/1964 | Hansen et al. | 251—315 X |

FOREIGN PATENTS 606,902    1960    Italy.

M. CARY NELSON, *Primary Examiner.*

ISADOR WEIL, *Examiner.*

J. DEATON, L. KAMPSCHROR, *Assistant Examiners.*